United States Patent [19]

Braschel et al.

[11] Patent Number: 4,497,026
[45] Date of Patent: Jan. 29, 1985

[54] ANTI-WHEEL-LOCK CONTROL SYSTEM

[75] Inventors: Volker Braschel, Heilbronn; Reiner Emig, Oftersheim; Heinz Leiber, Oberriexingen; Michael Mendel, Heidelberg; Jürgen Gerstenmeier, Neckargemünd-Waldhilsbach, all of Fed. Rep. of Germany

[73] Assignee: Robert Bosch GmbH, Stuttgart, Fed. Rep. of Germany

[21] Appl. No.: 414,348

[22] PCT Filed: Nov. 4, 1981

[86] PCT No.: PCT/DE81/00187
§ 371 Date: Aug. 18, 1982
§ 102(e) Date: Aug. 18, 1982

[87] PCT Pub. No.: WO82/02862
PCT Pub. Date: Sep. 2, 1982

[30] Foreign Application Priority Data

Feb. 26, 1981 [DE] Fed. Rep. of Germany ....... 3107115

[51] Int. Cl.³ .............................................. B60T 8/10
[52] U.S. Cl. ..................................... 364/426; 303/99; 303/105; 180/197
[58] Field of Search .................... 364/426; 303/91, 97, 303/99, 105, 107, 108

[56] References Cited

U.S. PATENT DOCUMENTS

| | | | |
|---|---|---|---|
| 3,575,592 | 4/1971 | Carter, Jr. | 303/108 |
| 3,790,227 | 2/1974 | Dozier | 303/105 |
| 3,935,538 | 1/1976 | Kizler et al. | 328/38 |
| 3,988,042 | 10/1976 | Aoki et al. | 303/108 |
| 4,039,227 | 8/1977 | Sivulka | 303/97 |
| 4,053,026 | 10/1977 | Fujiki et al. | 180/98 |
| 4,136,912 | 1/1979 | Hesse et al. | 303/91 |
| 4,193,642 | 3/1980 | Miller | 303/97 |
| 4,251,118 | 2/1981 | Rothen et al. | 303/91 |

FOREIGN PATENT DOCUMENTS

| | | | |
|---|---|---|---|
| 2068146 | 8/1981 | United Kingdom | 364/426 |
| 2092249 | 8/1982 | United Kingdom | 303/105 |

OTHER PUBLICATIONS

D. G. Smedley, Second International Conference on Automotive Electronics, London, England, (Oct. 29–Nov. 2, 1979), pp. 33–37.

Primary Examiner—J. V. Truhe
Assistant Examiner—Bentsu Ro
Attorney, Agent, or Firm—Frishauf, Holtz, Goodman, Woodward

[57] ABSTRACT

The anti-wheel-lock control system has a wheel speed transducer (1), an evaluation circuit (3), and a braking pressure control device (4, 5).

Particularly in commercial vehicles and at low speed, the vehicle wheel may exhibit frictional oscillations; these frictional oscillations appear as rapidly changing speed signals when sensed by the value transducer (1), which simulate sudden high wheel speed. The invention addresses the problem of eliminating these disturbances. The changes in the speed signals are physically impossible, and the disturbances are eliminated by a circuit (15, 16, 27, 28, 29) which recognizes physically impossible changes in the wheel speed by comparing the actual speed signals with a simulation threshold at which changes in speed are physically impossible. This recognition circuit triggers an auxiliary device (18, 24) upon the occurrence of the disturbance, and the auxiliary device provides an auxiliary wheel speed signal for the control device based on wheel speed measured most recently prior to the disturbance.

8 Claims, 4 Drawing Figures

ANTI-WHEEL-LOCK CONTROL SYSTEM

The invention relates to an anti-wheel-lock control system in which wheel speed signals are derived from rotation transducers for subsequent processing.

BACKGROUND

Various anti-wheel-lock control systems are known. In such known anti-wheel-lock control systems, frequency filters are used to suppress disturbance signals generated by frictional oscillations. Such frictional oscillations occur particularly in commercial vehicles at low speed (shortly before a standstill). Their frequency is in the range of a few hundred Hertz. The transducers of the anti-wheel-lock controller sense these oscillations and transmit them to a controller in the form of disturbance signals, which may evaluate them as high-speed signals. Thus, an excessively high wheel speed is simulated by the disturbance signal, causing malfunctioning of the controller.

Known controllers made to solve this problem have the disadvantage that they do not permit digital signal processing, at least in this speed range of the controller, and thus construction in integrated circuit form, e.g. as a microprocessor, is difficult.

THE INVENTION

It is an object of the invention to provide a means for suppressing disturbance signals, which also permits digital signal processing within the controller.

Briefly, it has been found that upon the occurrence of frictional oscillations, the wheel will behave in such a manner that the output signals which are generated by the transducer will be representative of signals which are actually physically impossible in the system if the wheel were to operate normally. To analyze these signals, then, threshold signals are generated which simulate such physically impossible behavior of the wheel speed signal, that is, simulate extreme variations in wheel speed, or, effectively, in wheel acceleration. This phenomenon, namely physically impossible wheel acceleration, is utilized and analyzed and the signal is then analyzed for outputs which would be physically impossible. If such physically impossible outputs are recognized, the signal from the transducer is not applied to the wheel slip control system but, rather, inhibited, and an auxiliary signal, based on a previously measured and normal signal is, instead, connected.

The system, thus, includes a memory to store, continuously, speed signals as they are derived from the transducer. A disturbance simulating signal is generated, representative of a physically impossible condition. If the transducer signal exceeds a minimum threshold, or falls within a threshold range of the distrubance signal—which would be physically impossible as a normal signal—then its effect on the wheel slip system is inhibited, for example by switching-over or blocking of a gate, and, instead, a previously stored wheel signal is connected to the wheel speed evaluation system.

The system has the advantage that it can eliminate distrubances by digital signal processing which can be monitored with a self-checking device; this is accomplished more easily than in apparatus which use analog filters.

DRAWINGS

The drawings show in:

FIG. 1: the fundamental structure of one exemplary embodiment of an anti-wheel-lock control system;

FIG. 2: a basic circuit diagram for the suppression of disturbances according to the invention;

FIG. 3: one exemplary embodiment of components for use in the system of FIG. 2; and FIG. 4: a digram explaining the mode of operation.

DETAILED DESCRIPTION

Figure 1:
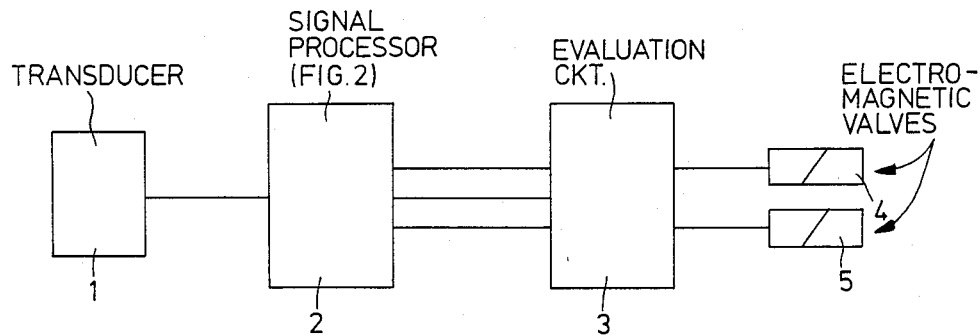

A transducer 1 senses wheel speed as shown in FIG. 1. The signals from the transducer 1 are processed in block 2 and then delivered to an evaluation circuit 3, in which trigger signals for electro-magnetic valves 4 and 5 are obtained on the basis of the signals from the signal processing block 2, for instance signals relating to deceleration, acceleration or slip. Brake fluid pressure is controlled by the magnetic valves 4 and 5, reducing or increasing the pressure, or holding it constant.

Figure 2:
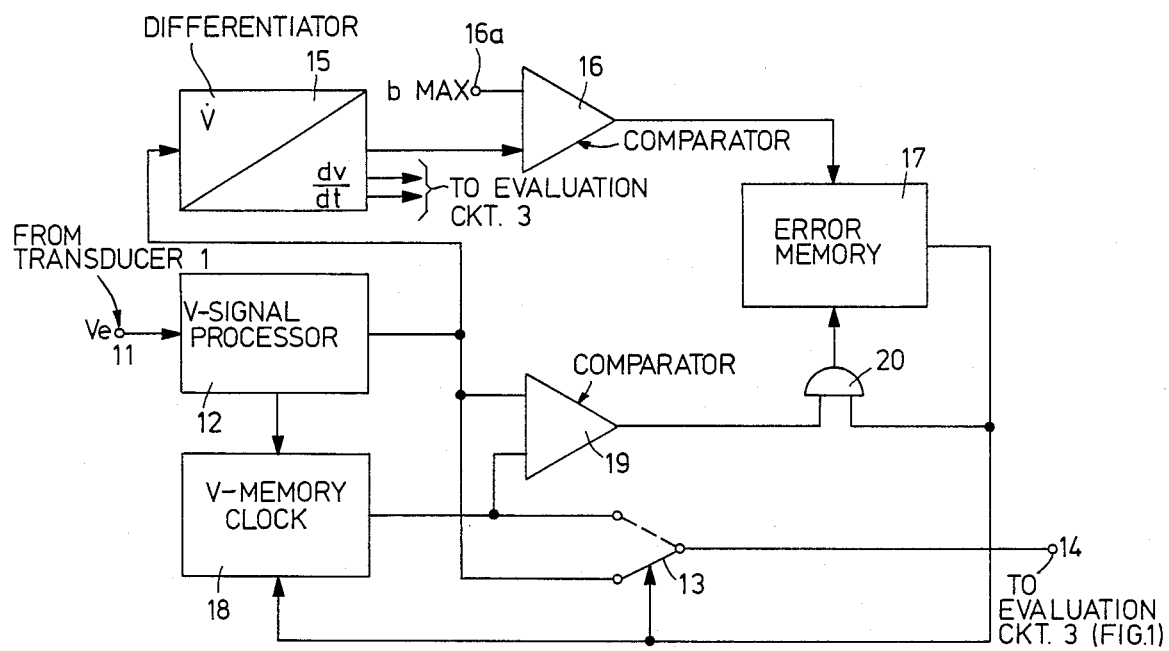

In accordance with a feature of the invention, and in order to eliminate the disturbances appearing because of frictional oscillations at the wheels, the circuit system of FIG. 2 is incorporated in the signal processing block 2 of FIG. 1.

Pulses arriving at the terminal 11 from the transducer 1 are coupled to a signal processor block 12 where a wheel speed signal is formed from them. This wheel speed signal normally (when there is no disturbance) proceeds via a switch 13 to a terminal 14, to which further members for signal preparation are connected. The output signal of the block 12 is also connected to a differentiator 15, and its output signal in turn is connected to a comparison element or comparator 16, which emits a signal whenever a predetermined acceleration threshold $b_{max}$ at terminal 16a has been exceeded. This threshold $b_{max}$ is selected such that during normal operation (wheel acceleration) it can never be exceeded, that is, its being exceeded is physically impossible.

The output signal of the comparison element 16 sets an error memory 17, the output signal of which, when generated, (1) switches over the switch 13 to broken-line position, so that the terminal 14 is now connected with the output of a memory element 18, and (2) retains the stored value in the memory element 18.

The wheel speed signal, processed in block 12, is delivered continuously, but somewhat delayed, to memory element 18 which may be termed a "prior speed memory", and this value is stored unitl the appearance of the next subsequent speed value signal, so long as the error memory 17 has not been set. As soon as the error memory 17 is set, the most recently stored speed value in memory 18 is retained, and it is this value which is then delivered to the terminal 14 as the auxiliary speed value to be utilized. Because the storage occurs in a somewhat delayed manner, the speed value from before the onset of the disturbance is accordingly still present in the memory 18.

If the output value of the signal processor block 12 then returns to a value equal to or lower than the value stored in memory 18, i.e. drops below the threshold $b_{max}$, which is only possible after the disappearance of the disturbance, then the error memory 17 is reset by a comparator 19 via a gate 20, and a transition back to normal operation is again made. During the period of disturbance, the value stored in the memory 18 serves as the auxiliary speed value and, also, as a comparison reference for the signals from processor 12 for the reset comparator 19. The differentiator 15 can also serve to obtain deceleration and/or acceleration signals for the evaluation circuit 3 and the actual control means.

One exemplary embodiment of the components will now be explained in greater detail, referring to FIGS. 3 and 4.

The pulses of the transducer 1 of FIG. 1 are delivered to the terminal 21 of a counter 22, which terminal 21 corresponds to terminal 11, FIG. 2. They cause the counter 22 to be set to a predetermined preliminary charge number value A1, which is established via a set number input unit 23. Backward counting pulses are delivered to the counter 22 from an integrator, forming a memory, having a subsequent count number/frequency converter 24 having an output terminal 26, the frequency of which is proportional to the wheel speed measured just previously. The preliminary charge number value and the frequency of the backward-counting pulses are so matched that if the wheel speed does not vary, the counter 22 is returned to zero whenever a new pulse appears at the terminal 21. However, if the speed varies from one measurement to the next, then, upon the appearance of the next pulse at the terminal 21, there is either a positive or a negative remainder left in the counter 22. This value is ascertained by the count decoder forming a correction member 25, for instance a correcting counter, and is transferred to the integrator 24 in order to correct the then present wheel speed value for the next cycle. The wheel speed value pertaining at a given time is available at the output terminal 26 for further processing. Components 22, 23, 24, 25 of FIG. 3 thus carry out the functions of units 12, 18 of FIG. 2.

Connected to the counter 22 is a comparator or comparison element 27, in which the instantaneous value A(t) (FIG. 4) of the counter 22 is compared with a predetermined comparison threshold value B, which is pre-specified in block 28 to provide a comparison threshold setting B. The comparator 27 emits a signal as long as A(t) is greater than B. The course of A(t) over the time t may be seen in FIG. 4, as can that of the selected value B. A signal is thus always produced by the comparator 27 whenever the duration of the period of actual measurement equal to or less than the time t2. Components 22, 27, 28 thus carry out the functions of units 15, 16 of FIG. 2.

This signal is supplied to a gate and counter circuit 29, which also receives the pulses of the transducer terminal 21 which corresponds to terminal 11, FIG. 2. In one embodiment, the counting function is not used and, indeed, may be omitted. This gate circuit emits a blocking signal to a gate 30, whenever a next pulse arrives at the terminal 21 within the period between t1 and t2 (FIG. 4). A pulse before time t2 would mean a physically impossible change in wheel speed. Thus, by selection of a time comparison, e.g. a value B, a physically impossible change in the wheel speed is simulated. As a result of the blocking of the gate 30, an incorrect resetting or correction in the wheel speed value in the loop formed by counter 22, decoder 25, and unit 24 is then prevented. In this form of embodiment, it is sufficient to have the correction effected in the loop to carry out the correction in a somewhat delayed manner, just so that the blockage of correction becomes effective prior to a possible incorrect change.

If correction of the output at terminal 26 which is connected to, or may form terminal 14, FIG. 2 is to be prevented only after the circuit has ascertained that a certain or predetermined number of pulses arrive too closely together at the terminal 21, then block 29 must be constructed as a combined counter and gate circuit. Further, the correction due to the closely spaced pulses, i.e. arising between time t1 and t2, FIG. 4, must be compensated for. This is effected by a signal via the line 31. This can be accomplished by correcting the count in the loop including the counter 22 by only a specific magnitude, i.e. a predetermined digital increment per pulse at the terminal 21, and controlling the integrator 24 via the counter in block 29 and lines 31 to effect a subtraction corresponding to the predetermined increment based on said certain or predetermined number of pulses. Components 27, 29, 30, 24 thus carry out the functions of units 16, 17, 19, 20 and 13 of FIG. 2.

Figure 3:
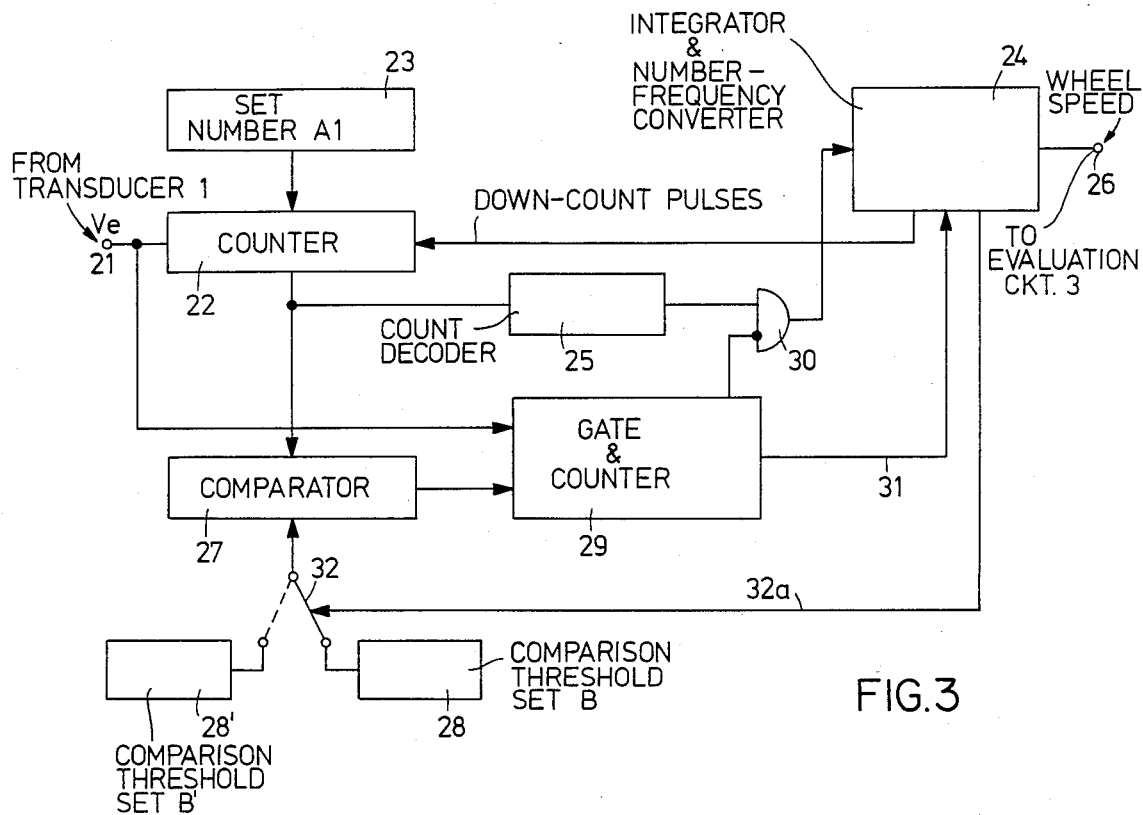
Figure 4:
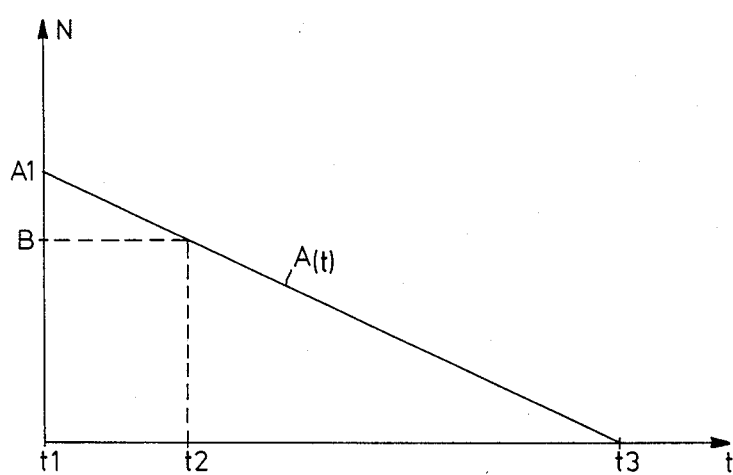

FIG. 3 shows a further block 28', by way of which a second comparison threshold value B' can be predetermined. The switchover of the comparison threshold values, which signifies a variation in the sensitivity of the circuit, is controlled by the integrator 24 over line 32a via a switch 32, in accordance with the instantaneous wheel speed.

We claim:

1. An anti-wheel-lock control system for vehicles comprising
a wheel speed transducer (1) providing actual wheel speed signals, and, upon oscillating operation of wheels, disturbance signals;
an evaluation circuit (3) coupled to the speed transducer and receiving signals therefrom, and generating control signals;
devices (4, 5) coupled to the evaluation circuit for varying braking pressure;
and a network to recognize disturbance signals occurring due to frictional oscillations of the wheels and inhibiting said disturbance signals from affecting operation of the evaluation circuit (3) comprising
means (16a, $b_{max}$; 28, B, 28', B') for setting a simulation signal which has a range corresponding to a change in wheel speed which is physically impossible;
recognition circuit means (15–17; 22, 27, 29) comparing the wheel speed signals with the simulation signals and providing an output if the wheel speed signals include disturbance signals which represent physically impossible conditions in the system and hence are within the range of the simulation signals;
a memory (18; 24) including an integrator continuously storing wheel speed signals as received from the transducer and providing auxiliary wheel speed signals;
and an auxiliary device (13, 17; 30) connected to and controlled by said recognition circuit means and inhibiting application of signals from the transducer (1) to the evaluation circuit and, instead, connecting the storage means to the evaluation circuit to provide auxiliary wheel speed signals for the control devices (4, 5) from wheel speed measured prior to appearance of the disturbance in the signals derived from the transducer (1); and wherein, for digital processing of signals in the system,
the transducer (1) provides output signals in pulse form;
a first counter (22) is provided;
means (23) for setting the first counter to a predetermined count value comprising a number entering means (23) which sets said first counter (22) to a predetermined count value, said first counter counting down from said predetermined count value;

control means (24) coupled to the counter and changing the count value therein at a rate representative of the count number set into the counter upon occurrence of a preceding pulse from the transducer, so that the count number counted by the counter, upon no change in wheel speed, will be unvarying, the counter control means including said integrator (24) and a number-frequency converter to provide numbered pulses to said first counter (22) and to control the counting state of said first counter, said integrator controlling the first counter to count down at a frequency which is in proportion with a previously measured speed value as counted by said counter and controlled by said integrator (24), the pulses from the integrator so controlling the first counter (22) that, when wheel speed is unvarying, said first counter is placed into zero position until the appearance of a next transducer pulse;

a count value decoder (25) is provided, connected to the first counter for decoding the count value deviation (A) from zero of said counter, said count value decoder being connected to said integrator (24) in a closed loop to correct the integration rate of said integrator so that, upon a subsequent cycle of the counter when trigered by a speed signal from the transducer, and under then unvarying wheel speed conditions, the counter will then again count to zero;

and wherein the recognition circuit means comprises a digital comparator (27) comparing the actual count state (A) of said first counter (22) with a count value derived from said simulation signal setting means and providing a count state representative of a physically impossible condition in the system, said comparator providing an output signal representative of the comparison of the number (A) in the counter and the threshold (B, B') supplied thereto by said simulation signal setting means; and wherein a gate circuit (29, 30), forming said auxiliary device, is provided, coupled to said count decoder (25) and the integrator (24) and rendering change in the integrator ineffective if the count state in the first counter (22) exceeds said threshold (B) applied thereto by the simulation signal generating means (28), the integrator thereby maintaining the wheel speed signal as an auxiliary stored wheel speed signal representative of prior wheel speed.

2. System according to claim 1, wherein said simulation signal generating means comprises
a comparison threshold set circuit (28) providing a count number (B) to said comparator (27).

3. System according to claim 1, wherein the gate circuit (29, 30) is responsive to the output of the digital comparator (27) and inhibits change in the counting rate of said first counter (22) if the relationship of the predetermined value applied to the counter (22) and the comparison threshold set value (B) has changed beyond a predetermined level.

4. System according to claim 1, wherein the first counter (22), the count decoder (25) and the counter control means (24) are connected in a closed loop;

and wherein the gate (30) is coupled in said loop and inhibits signal transfer within said loop for correction of the count state of the counter (22) by said counter control means if the recognition circuit means has recognized that the count state of the counter represents a physically impossible condition in the system by being beyond the range of said simulation signal.

5. System according to claim 1, wherein the recognition circuit means includes a second counter (29) connected to said comparator (27) and responsive to counting cycles of said first counter (22);

the gate circuit includes a gate (30) connected to and controlling said integrator (24) to permit, or inhibit change in the counting rate of said first counter, said gate being controlled by the count state of said second counter and preventing change in the counting rate of said first counter only after the second counter (29) has counted through a predetermined number.

6. System according to claim 5, wherein the integrator (24) integrates in predetermined integration steps or increments;

and wherein the change controlled by said second counter (29) comprises changing the state of the integrator by the number of reverse integrating steps corresponding to the count number supplied by said second counter (29).

7. System according to claim 1, wherein said simulation signal generating means (28, B; 28', B') comprises two comparison threshold set generating means (28, 28'), and a transfer switch (32) connected to and controlling a selected one (B, B') of threshold set values or numbers to the recognition circuit means;

and means (32a) connected to and controlling said transfer switch (32) as a function of wheel speed.

8. System according to claim 1, wherein the first counter (22), the count decoder (25) and the counter control means (24) are connected in a closed loop;

and wherein the gate circuit includes a gate (30) coupled in said loop and inhibiting signal transfer within said loop for correction of the count state of the counter (22) by said counter control means if the recognition circuit means has recognized that the count state of the counter represents a physically impossible condition in the system by being beyond the range of said simulation signal;

wherein the recognition circuit means includes a second counter (29) connected to said comparator (27) and responsive to counting cycles of said first counter (22);

said gate (30) being controlled by the count state of said second counter (29) and preventing change in the counting rate of said first counter (22) by inhibiting signal transfer in said loop only after the second counter has counted through a predetermined number.

* * * * *